(12) United States Patent
Bharadwaj et al.

(10) Patent No.: US 7,487,336 B2
(45) Date of Patent: Feb. 3, 2009

(54) METHOD FOR REGISTER ALLOCATION DURING INSTRUCTION SCHEDULING

(75) Inventors: Jayashankar Bharadwaj, Saratoga, CA (US); Tatiana Shpeisman, Menlo Park, CA (US); Ali-Reza Adl-Tabatabai, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 558 days.

(21) Appl. No.: 10/734,627

(22) Filed: Dec. 12, 2003

(65) Prior Publication Data

US 2005/0132171 A1 Jun. 16, 2005

(51) Int. Cl.
G06F 9/30 (2006.01)
G06F 9/40 (2006.01)
G06F 15/00 (2006.01)

(52) U.S. Cl. ............... 712/217; 712/216; 717/153; 717/161

(58) Field of Classification Search ........... 712/217, 712/218, 216; 717/153, 161, 140
See application file for complete search history.

(56) References Cited

U.S. PATENT DOCUMENTS 6,427,234 B1 * 7/2002 Chambers et al. ......... 717/140
6,651,247 B1 * 11/2003 Srinivasan ................ 717/161
7,007,272 B2 * 2/2006 Clarke ....................... 717/153

OTHER PUBLICATIONS

S. Pinter, "Register Allocation with Instruction Scheduling: a New Approach", Dept. of Electrical Engineering, Israel Institute of Technology, Haifa, Israel, 19 pages, Jun. 1993.
D. Bradlee et al., "Integrating Register Allocation and Instruction Scheduling for RISCs", Dept. of Computer Science, Univ. of Washington, Seattle, Washington, 1991, 9 pages.
G. Chaitin, "Register Allocation & Spilling Via Graph Coloring", IBM Research, Yorktown Heights, NY, 1982, 4 pages.
M. Poletto et al., "Linear Scan Register Alocation" ACM Trans. on Programming Languages and Systems, vol. 21, No. 5, Sep. 1999, pp. 895-913.
S. Freudenberger et al., "Phase Ordering of Register Allocation and Instruction Scheduling", Presented at Code Generation—Concepts, Tools & Techniques, Jul. 1991, 10 pages.
F. Chow et al., "The Priority-Based Coloring Approach to Register Allocation", ACM Trans. on Programming Languages and Systems, vol. 12, No. 4, Oct. 1990, pp. 501-536.

* cited by examiner

Primary Examiner—Niketa I. Patel
Assistant Examiner—Jesse R Moll
(74) Attorney, Agent, or Firm—Blakely, Sokoloff, Taylor & Zafman LLP

(57) ABSTRACT

The present disclosure relates to the allocation of registers the scheduling of instructions, and, more specifically, to the classifying of operands and allocation of registers to local operands.

46 Claims, 5 Drawing Sheets

METHOD FOR REGISTER ALLOCATION DURING INSTRUCTION SCHEDULING

BACKGROUND

1. Field

The present disclosure relates to the allocation of registers the scheduling of instructions, and, more specifically, to the classifying of operands and allocation of registers to local operands.

2. Background Information

Compilers and other translation systems typically transform one set of symbols into another by following a set of syntactic and semantic rules. Two of the actions often performed by a compiler include scheduling instructions and allocating registers. The compiler typically determines in what order a set of instructions will be executed. Also, the compiler typically allocates registers for use by the instructions.

Most optimizing compliers perform the phases of register allocation and code scheduling as separate steps. However, because the first step is not aware of the limitations of the second step, the optimizations made in the second step are usually unnecessarily constrained by the incorrect assumptions made in the first step. As such, the scheduling and register allocation stages may be integrated.

Integrating the scheduling and register allocation may decrease compilation times. Compile time saving may be obtained by sharing some of the data structures between the scheduler and the register allocation, and from not having to reschedule blocks of instruction with spill operations.

A register, in this context, may be a set of bits of high-speed memory within a processor or other electronic device, used to hold data for a particular purpose. Typically registers are considered the closest memory available to a processor. Registers typically include two types: scratch and preserved registers. Often when a set of instructions calls a second set of instructions (hereafter, "calls a function"), the contents of the registers used by the first set of instructions may be replaced or overwritten with values used by the called function. When the function exits and returns control back to the first set of instructions, some of the values that the function replaced are expected to be restored back to the state that existed before the function was called. These registers, which are restored, are referred to as "preserved registers" because the values of the registers are preserved across a function call. Scratch registers, conversely, are typically not preserved across a function call. The values of a scratch registers are generally discarded when the function is called.

Often processors do not contain enough registers to hold the values needed to fully execute a set of instructions and any functions that may be called. Therefore, register values are frequently copied from the registers to a higher level of memory (e.g. cache or system memory). The operation of copying registers to memory is often referred to as a "spill." The opposite operation of copying memory to the register is known as a "fill." While some spills and fills are to be expected, attempts are often made to minimize the occurrences. Each spill/fill involves inserting a number of unproductive instructions into the set of instructions and, occasionally, idling the processor as it waits for the information to be transferred.

One of the problems associated with allocating a register during scheduling is making an optimal choice between using a scratch or a preserved register. If a preserved register is used, its original contents will have to be saved before the register is first used and restored after its last use within the function. If a scratch register is used to store a value that lives across a function call, special instructions will have to be used to save and restore the register value before and after the call. These saves and restores from memory impact performance.

The "lifetime" of a value is typically defined as the time between when the value is first defined or used, and the last time it is used. When a first instruction that defines or uses a value is scheduled, a register needs to be immediately allocated to the value. Otherwise, for example, the scheduler will not be able to properly anticipate any needed spills or fills if it does not known the number of registers in use. However, at this point, it is not always known whether or not the lifetime of that value will interfere with a function call. To minimize spills/fills, a scratch register is preferred, if the value will not live across a function call. However, if the value will live across a call, a preserved register if typically preferred.

BRIEF DESCRIPTION OF THE DRAWINGS

Subject matter is particularly pointed out and distinctly claimed in the concluding portions of the specification. The disclosed subject matter, however, both as to organization and the method of operation, together with objects, features and advantages thereof, may be best understood by a reference to the following detailed description when read with the accompanying drawings in which:

DETAILED DESCRIPTION

In the following detailed description, numerous details are set forth in order to provide a thorough understanding of the present disclosed subject matter. However, it will be understood by those skilled in the art that the disclosed subject matter may be practiced without these specific details. In other instances, well-known methods, procedures, components, and circuits have not been described in detail so as to not obscure the disclosed subject matter.

Figure 1:
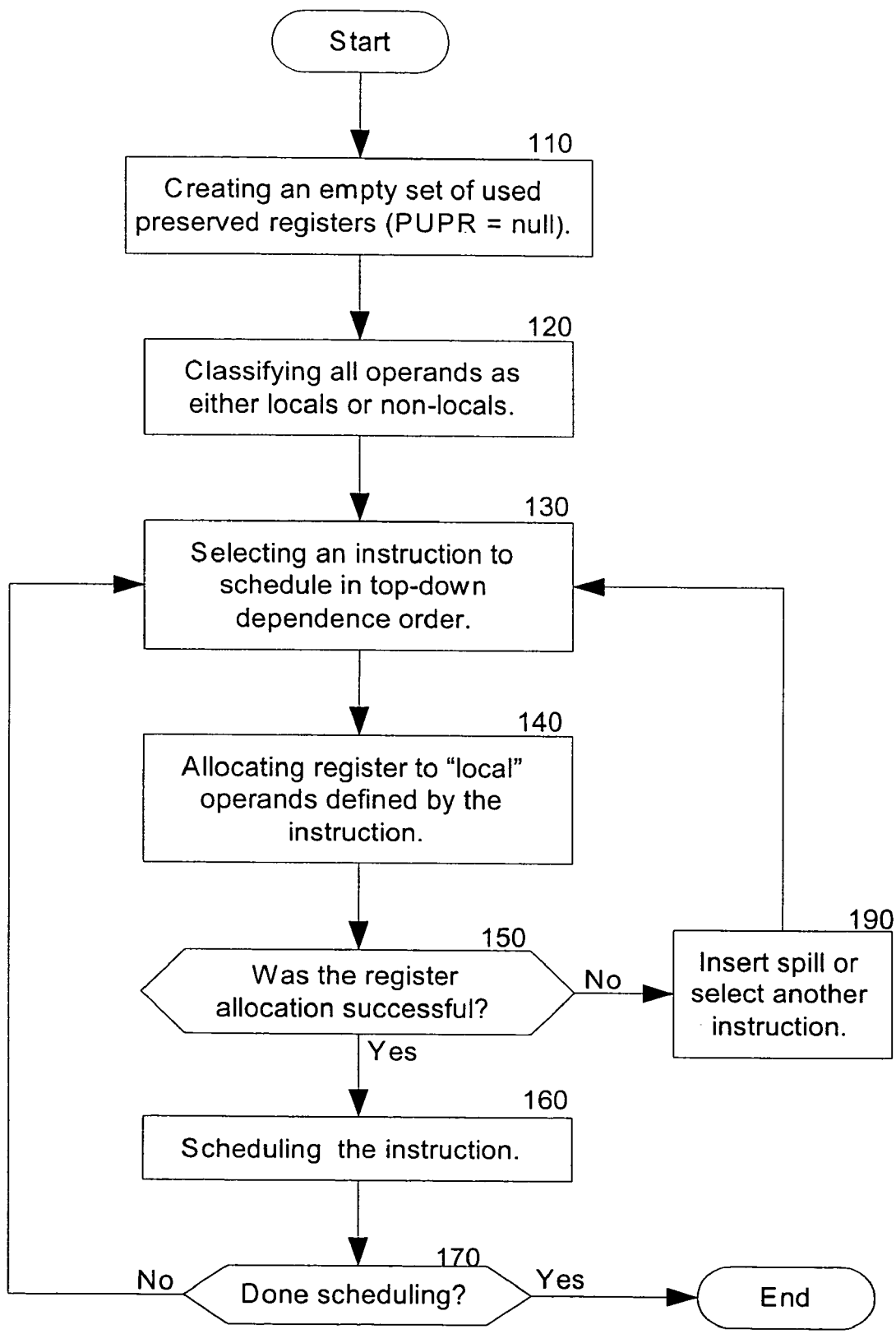
FIG. 1 is a flowchart illustrating an embodiment of a technique for scheduling instructions in accordance with the disclosed subject matter.

FIG. 1 is a flowchart illustrating an embodiment of a technique for scheduling instructions in accordance with the disclosed subject matter. Block 110 illustrates that a set that stores a list of the used preserved registers may be created or set to an empty state. In one embodiment the set may include both preserved register that are currently being used and preserved registers that have been previously used with in the code block.

Block 120 illustrates that, in one embodiment, the operands associated with the instruction may be classified as either "local" or "non-local." In one embodiment, an instruction may be associated with zero or more operands, each representing a register. In one embodiment, an operand classified as "local" if it has a single definition and its live range does not cross a loop boundary. All other operands may be classified as "non-local." In one embodiment, "non-locals" may be referred to as "global." In one embodiment, local live ranges may constitute the large majority of live ranges.

Since, in one embodiment, a local operand has a single definition and does not live across a loop backedge, the operand definition typically dominates any use. Therefore, two local operands are likely to interfere only if one is defined before the other. In addition, if a first local operand is defined before a second local operand, it may only interfere if the second local operand is defined before the end of the first local operand's live range.

In one embodiment, the operands may be classified into one of three categories: local, global, and variable. The global and variable classifications may be considered "non-local." In one embodiment, an operand classified as "variable" may have multiple definitions. An operand classified as "global" may include a single definition whose live range spans a loop boundary. Finally, all other operands may be classified as "local."

Block 130 illustrates that the instructions may be processed in topological dependence or top-down order. That is, instructions may be processed in order in which they are sequentially encountered. In one embodiment, the topological processing may be confined within function or method blocks. In one embodiment, the topological processing may follow a particular instruction trace. The topological processing may assure that a register is allocated to a local operand definition before any use of the operand is scheduled. Furthermore, when scheduling the definition of a local operand, it may be assured that it interferes only with those previously allocated local operands that are live at that point. Therefore, is may be possible to avoid the need for register moves by allocating a register not previously allocated to such operands.

Block 140 illustrates that a register may be allocated to any local operands defined by the instruction. In one embodiment, global operands may have registers allocated utilizing a known technique. In another embodiment, registers for the global operands may be allocated either before or after the local operands are allocated. In one embodiment, only local operands may be allocated by the integrated register allocator. Global operands may be allocated by a separate register allocator. Of course, these are merely a few non-limiting examples of embodiments of the disclosed subject matter. In one embodiment, the local registers may be allocated utilizing a technique illustrated by FIGS. 2, 3 & 4.

Figure 2:
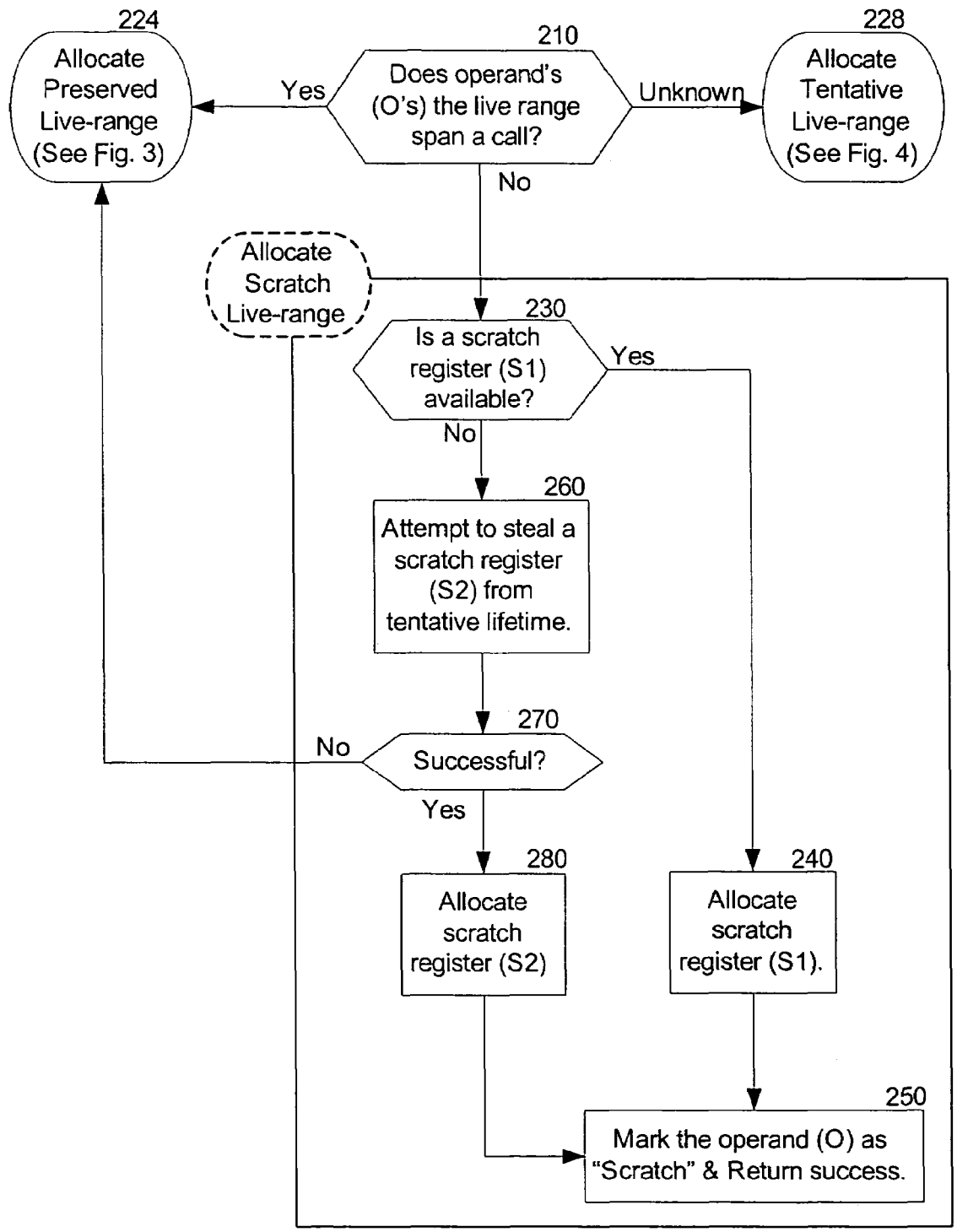
FIG. 2 is a flowchart illustrating an embodiment of a technique for allocating registers in accordance with the disclosed subject matter.

FIG. 2 is a flowchart illustrating an embodiment of a technique for allocating registers to local operands in accordance with the disclosed subject matter. Block 210 illustrates that the operand is examined to determine if its live range will span a function call. At that time the register allocator may know that the operand's live range will span a call, or will not span a call, or the register allocator may not be able to determine this. It is contemplated that the majority of operands may be classified as "unknown" or "tentative" when first encountered. As will be described in detail below, if an operand is classified as "tentative", both a scratch and preserved register may be reserved for the operand, and the unnecessary register may be released when more information is available. However, it is within the scope of the disclosed subject matter that tentative operands may not comprise the majority of the operands.

If it is determined that the live range will not span a function call, an attempt to allocate a scratch register will be made, as illustrated by Blocks 230, 240, 250, 260, 270, & 280. Block 230 illustrates that a check may be made to determine if a scratch register (referred to as "S1") is available for allocation. If so, Block 240 illustrates that the scratch register (S1) will be allocated to the local operand. Block 250 illustrates that, in one embodiment, the operand may be marked as "scratch" and the register allocator may return a value that indicates that allocation was successful.

If a scratch register is not available, Block 260 illustrates that the scratch register (referred to as "S2") of a tentative operand may be stolen. In one embodiment, operands that are known to not span a function call may have preference over tentative operands when scratch registers are scarce. In such an embodiment, a scratch register that is reserved for a tentative lifetime may be stolen if the scratch register is needed for a known scratch lifetime.

Block 270 illustrates that a check may be made to determine if the attempt at stealing a scratch register from a tentative lifetime was successful. If not, an attempt may be made to utilize a preserved register, as illustrated by Block 224 and FIG. 3. In one embodiment, this may occur because no tentative lifetimes exist, or because all tentative lifetimes have been robbed of their scratch registers. If the theft was successful, Block 280 illustrates that the stolen scratch register (S2) will be allocated to the local operand.

Figure 3:
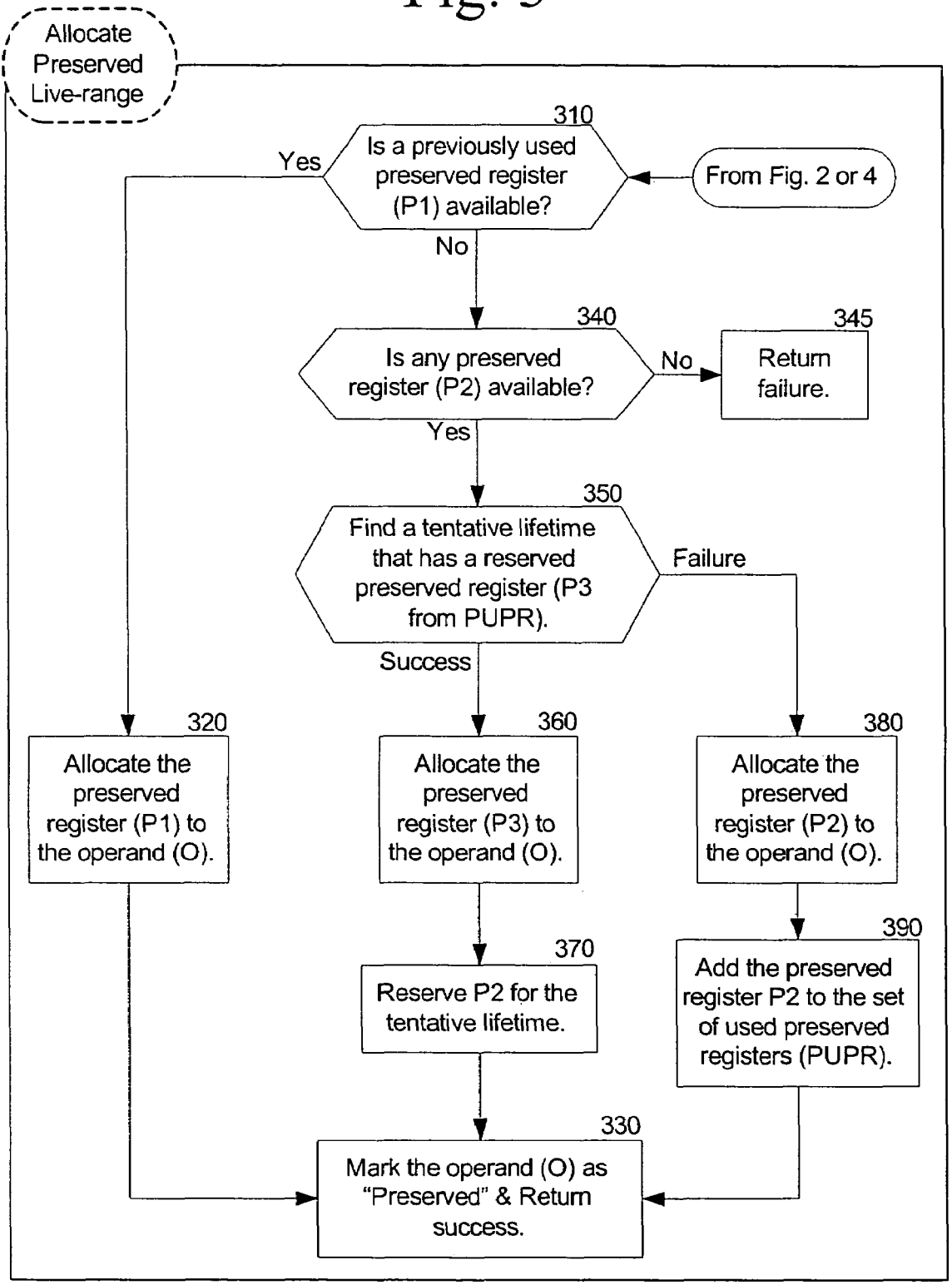
FIG. 3 is a flowchart illustrating an embodiment of a technique for allocating registers in accordance with the disclosed subject matter.

If the live range spans a function call, an attempt to allocate a persevered register will be made, as illustrated by Block 224 and FIG. 3. FIG. 3 is a flowchart illustrating an embodiment of a technique for allocating registers to local operands in accordance with the disclosed subject matter.

Block 310 illustrates that a check may be made to determine if a previously used preserved register (P1) is available for allocation. In one embodiment, the list or set of used preserved registers may be maintained (denoted in the figures by the term "PUPR"). In one embodiment, as preserved registers are allocated to operands, they may be added to the list of used preserved registers. In one embodiment, the list or set may include only preserved registers currently used. In another embodiment, the list may include all preserved registers ever used in this set of instructions. In one embodiment, registers in the set of used registers whose lifetimes have expired (i.e. the information is no longer needed) may be preferred for reuse over preserved registers that have not yet been used. In one embodiment, this list may be checked for a previously used but not currently in use preserved register.

If such a register (P1) is available, Block 320 illustrates that this preserved register (P1) will be allocated to the local operand (O). Block 330 illustrates that in one embodiment, the operand may be marked as "preserved" and a success value returned by the register allocator.

Block 340 illustrates that, if a previously used preserved register (P1) is not available, it may be determined if any preserved register (P2) is available. Block 345 illustrates that, in one embodiment, if no preserved registers are available, the register allocator may return a value that indicates failure to allocate a register.

Block 350 illustrates that an attempt may be made to steal a reserved preserved register (P3) from a tentative lifetime. In one embodiment, operands that are known to span a function call may have preference over tentative operands when preserved registers are scarce. As such, a preserved register that it reserved for a tentative lifetime may be stolen if the preserved register is needed for a known preserved lifetime. In one embodiment, only preserved registers that are both included in the list of previously used preserved registers (PUPR) and currently reserved for a tentative lifetime may be stolen.

If the theft was not successful, a new preserved register (P2) may be allocated to the operand (O). Block 390 illustrates that, in one embodiment, the new preserved register (P2) may be added to the list of used preserved registers (PUPR). In one embodiment, this may occur because no tentative lifetimes exist, or because all tentative lifetimes have reserved preserved registers that are not in PUPR. If the theft was successful, Block 360 illustrates that a stolen preserved register (P3) may be allocated to the local operand (O). Block 370 illustrates that in one embodiment, the new preserved register (P2) may be reserved for the robbed tentative lifetime. Effectively, the new preserved register (P2) may be swapped for the previously used, but reserved preserved register (P3). In one embodiment, the new preserved register may not immediately be added to the list of previously used preserved registers (PUPR). Block 330 illustrates that in one embodiment, the operand may be marked as "preserved" and a successful value returned by the register allocator.

Figure 4:
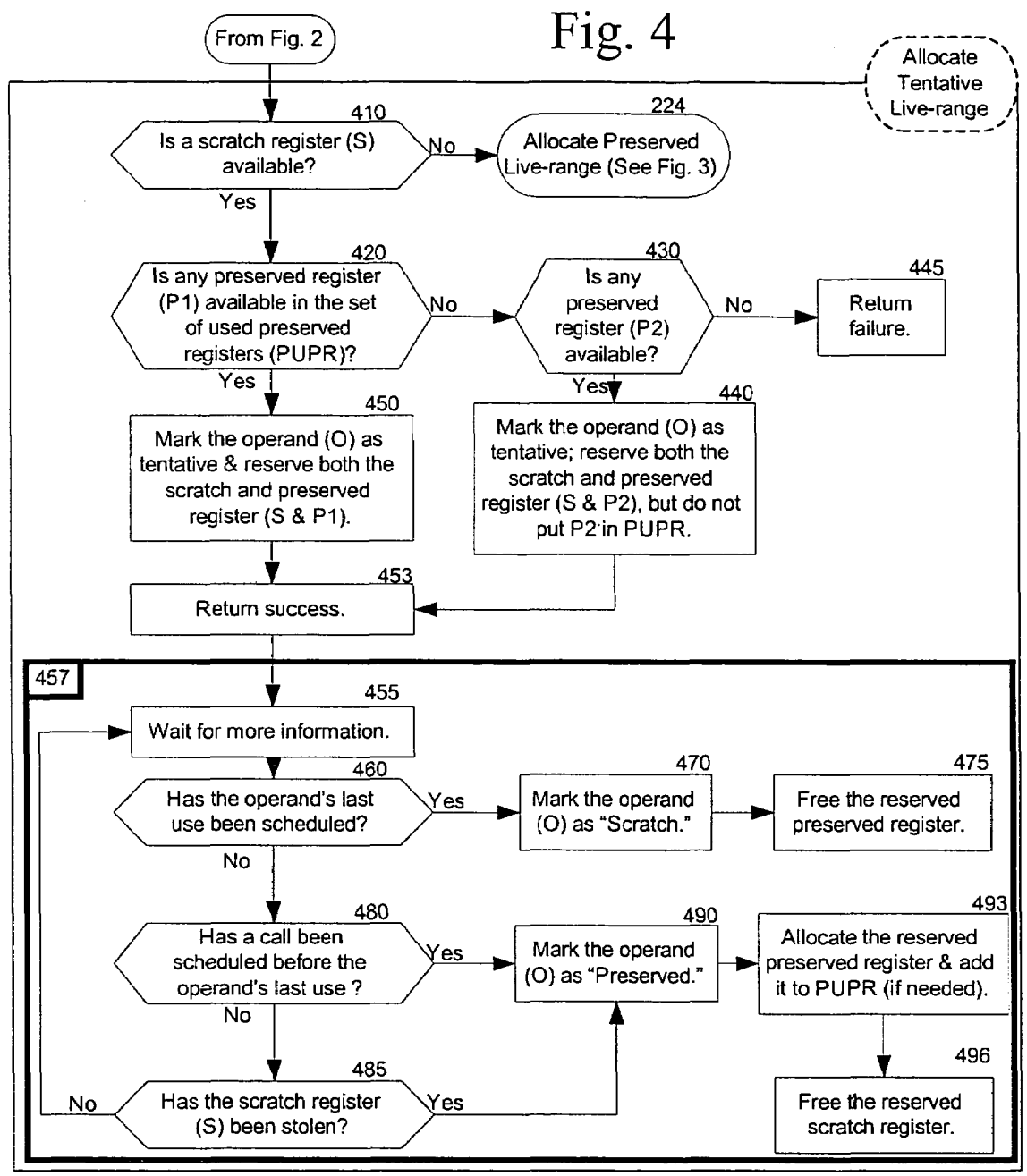
FIG. 4 is a flowchart illustrating an embodiment of a technique for allocating registers in accordance with the disclosed subject matter.

FIG. 4 and Block 228 of FIG. 2 illustrates that an operand whose lifetime is not known as either spanning a call or not, when first encountered may be treated as "tentative." It is contemplated that the majority of operands may be classified as "unknown" or "tentative" when first encountered. As was mentioned above, if an operand is classified as "tentative", both a scratch and a preserved register may be reserved for the operand, and the unnecessary register may be released when more information is available. However, it is within the scope of the disclosed subject matter that tentative operands may not comprise the majority of the operands.

FIG. 4 is a flowchart illustrating an embodiment of a technique for allocating registers in accordance with the disclosed subject matter. Block 410 illustrates that a check may be made to determine if a scratch register is available. If no scratch register is available, Block 224 illustrates that a preserved register may be allocated for the tentative lifetime, as discussed above and illustrated by FIG. 3.

Block 420 illustrates that in one embodiment, the availability of a preserved register (P1) in the set of previously used preserved registers (PUPR) may be checked. In one embodiment, it may be preferable to reserve, for the tentative lifetime, a preserved register from the list of previously used preserved registers.

If a previously used register (P1) is not available, Block 430 illustrates that a check may be made to determine if a new preserved register (P2) is available. In one embodiment, if no preserved register is available, the register allocator may return a value indicating failure to allocate a register for the operand, as illustrated by Block 445. In another embodiment, the failure notice may be delayed until operand's need to a preserved register is verified. In another embodiment, no failure may be reported if it is ultimately determined that the operand merely needs a scratch register. Of course, other error handling operations are within the scope of the disclosed subject matter.

If a new preserved register (P2) is available, Block 440 illustrates that the operand (O) may be marked as "tentative," and both the scratch (S) and new preserved (P2) registers may be reserved for the tentative lifetime. In one embodiment, the registers may be merely reserved. In another embodiment, the registers may be allocated. In one embodiment, the new preserved register may be reserved; however, the new preserved register may not be added to the set of previously used preserved registers until the preserved register is formally allocated, as illustrated in Block 440.

If, however, a preserved register (P1) from the list of used preserved registers (PUPR) is available, Block 450 illustrates that the operand (O) may be marked as "tentative," and both the scratch (S) and previously used preserved (P1) registers may be reserved for the tentative lifetime. In one embodiment, the registers may be merely reserved. In another embodiment, the registers may be allocated.

Block 453 illustrates that a value indicating success is returned. The current instruction may then be scheduled and another instruction processed, as illustrated by FIG. 1 and discussed in reference to Blocks 160 & 170 below.

Group 457 illustrates that as new instructions are scheduled they may be checked to determine if the instructions provide more information about any tentative live range. As new information becomes available, either the reserved scratch or preserved registers may be allocated to the instruction and the un-needed register freed. In one embodiment, the register allocator may periodically check if more information is available. For example, in a particular embodiment, the register allocator may determine if each new instruction provides information about any tentative live ranges. In another embodiment, the register allocator may be alerted when more information is known. However, these are merely a few non-limiting examples to which the disclosed subject matter is not limited.

Block 455 provides a starting point for this evaluation and illustrates that, in one embodiment, the state of the tentative register may not be evaluated until more information is available. However, in another embodiment, the operations of Group 457 may be executed in a separate thread or execution stream that execute substantially in parallel with the operations of FIG. 1, and may continuously check the status of the tentative register.

Block 460 illustrates that a check may be made to determine if the operand's last use has been scheduled. If so, in one embodiment, the operand (O) may be marked as "scratch," as illustrated by Block 470. Block 475 illustrates that the reserved scratch register (S) may be formally allocated and the reserved preserved register (P1 or P2) may be unreserved.

Block 480 illustrates that a check may be made to determine if function call has been scheduled before the operand's last use. If not, Block 485 illustrates that check may be made to determine if the operand's scratch register (S) was stolen, as illustrated by Block 260 of FIG. 2.

If the conditions of Blocks 480 or 485 are true, Block 490 illustrates that, in one embodiment, the operand (O) may be marked as "preserved." Blocks 493 illustrates that the preserved register (P1 or P2) may be formally allocated. In one embodiment, the allocated preserved register may be added to the set of used preserved registers (PUPR), if it is not already part of the list. Block 496 illustrates that the reserved scratch register (S) may be unreserved.

Block 150 of FIG. 1 illustrates that once an attempt to allocate a register to the local operand has been made, a check may be made to determine if the allocation was successful. If the allocation was not successful, Block 190 illustrates that a spill may be inserted in order to make more registers available or a different instruction may be selected for scheduling. In one embodiment, the failed instruction may be reselected for scheduling after a spill is scheduled. In one embodiment, from Block 190 the register allocator may not loop back to Block 130 but to Block 140.

Block 160 illustrates that once the local lifetimes associated with the instruction are allocated registers the instruction may be scheduled. Block 170 illustrates that once all instructions are scheduled the integrated scheduling and allocation may end. In the embodiment, a non-integrated register allocator may be used to allocate registers to operands classified as "non-local."

Figure 5:
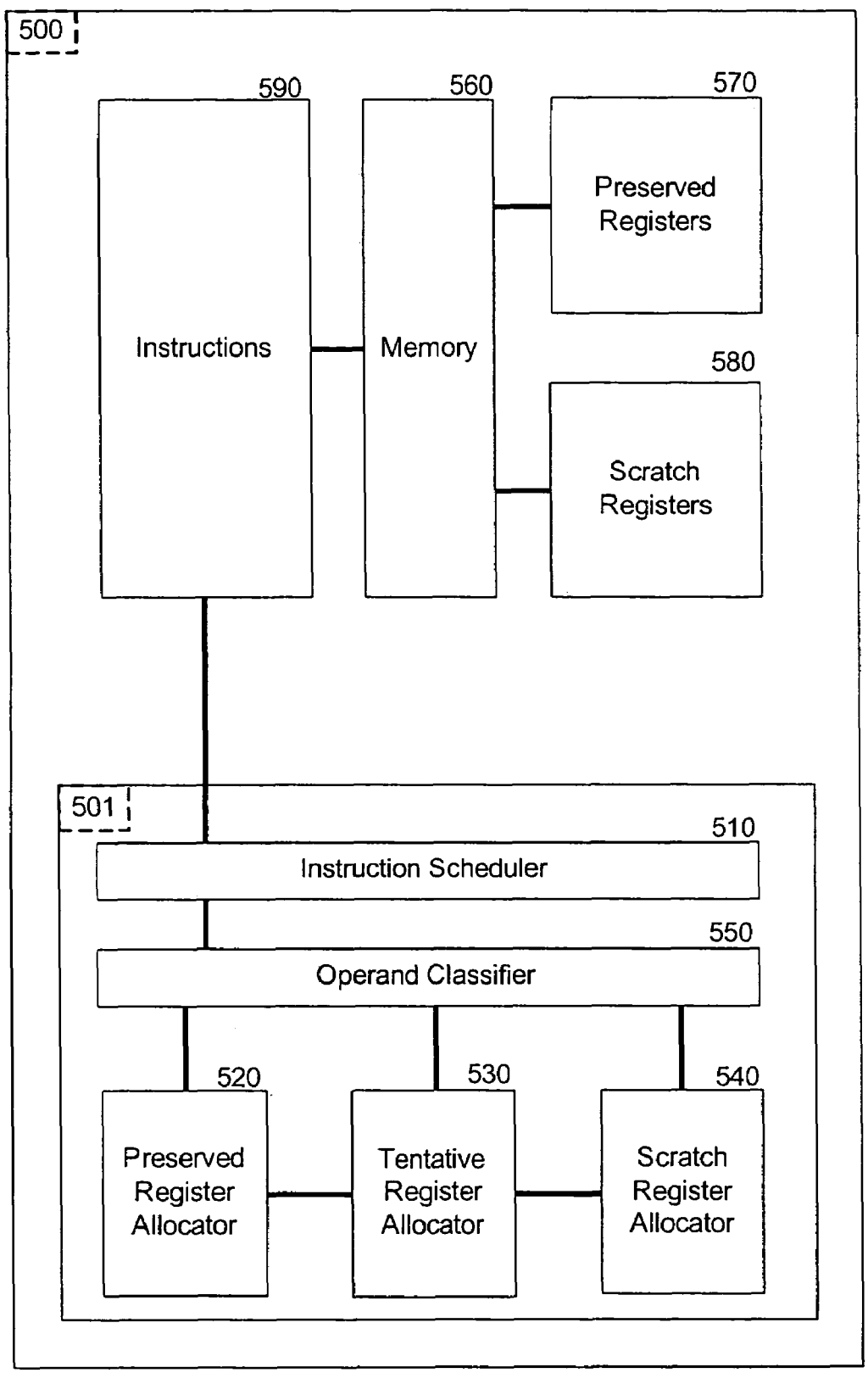
FIG. 5 is a block diagram illustrating an embodiment of a system and apparatus that allows for scheduling of instructions and the allocating of registers in accordance with the disclosed subject matter.

FIG. 5 is a block diagram illustrating an embodiment of a system 500 and apparatus 501 that allows for scheduling of instructions and the allocating of registers in accordance with the disclosed subject matter. The apparatus may include an instruction scheduler 510, an operand classifier 550, a preserved register allocator 520, a tentative register allocator 530, and a scratch register allocator 540. In one embodiment, the scratch preserved and tentative register allocators may be integrated, in whole or part, into a single register allocator.

The instruction scheduler 510 may be capable of scheduling instructions 590. In one embodiment, the instruction scheduler may be capable of performing the technique illustrated in FIG. 1. In one embodiment, the instruction scheduler may be merely capable of performing the operations of Blocks 110, 130, 150. 160, 170 & 190 of FIG. 1. The operand classifier 550 of FIG. 5 may be capable of classifying the operands associated with the instructions processed by the instruction scheduler and classifying them into one of at least two categories. In one embodiment, the operand classifier may be capable of performing Block 120 of FIG. 1.

The scratch register allocator 540 of FIG. 5 may be capable of allocating register to operands whose lifetime expires before a function call. In one embodiment, the scratch register allocator may be capable of performing a portion of the technique illustrated by FIG. 2. In one specific embodiment, the scratch register allocator may be capable of performing the techniques illustrated by Blocks 230, 240, 250, 260, 270, & 280 of FIG. 2.

The preserved register allocator 520 of FIG. 5 may be capable of allocating register to operands whose lifetime does not expire before a function call. In one embodiment, the preserved register allocator may be capable of performing a portion of the technique illustrated by FIG. 3.

The tentative register allocator 530 of FIG. 5 may be capable of allocating register to operands whose lifetime may or may not expire before a function call. In one embodiment, the tentative register allocator may be capable of performing the technique illustrated by FIG. 4.

The system 500 of FIG. 5 may include apparatus 501, instructions 590, memory 560 to facilitate spills & fills from the registers, preserved registers 570, and scratch registers 580. The preserved registers may be capable of storing values associated with the instructions that have lifetimes across a function call. The scratch registers may be capable of being storing values associated with the instructions that have lifetimes that terminate before a function call.

The techniques described herein are not limited to any particular hardware or software configuration; they may find applicability in any computing or processing environment. The techniques may be implemented in hardware, software, firmware or a combination thereof. The techniques may be implemented in programs executing on programmable machines such as mobile or stationary computers, personal digital assistants, and similar devices that each include a processor, a storage medium readable or accessible by the processor (including volatile and non-volatile memory and/or storage elements), at least one input device, and one or more output devices. Program code is applied to the data entered using the input device to perform the functions described and to generate output information. The output information may be applied to one or more output devices.

Each program may be implemented in a high level procedural or object oriented programming language to communicate with a processing system. However, programs may be implemented in assembly or machine language, if desired. In any case, the language may be compiled or interpreted.

Each such program may be stored on a storage medium or device, e.g. compact disk read only memory (CD-ROM), digital versatile disk (DVD), hard disk, firmware, non-volatile memory, magnetic disk or similar medium or device, that is readable by a general or special purpose programmable machine for configuring and operating the machine when the storage medium or device is read by the computer to perform the procedures described herein. The system may also be considered to be implemented as a machine-readable or accessible storage medium, configured with a program, where the storage medium so configured causes a machine to operate in a specific manner. Other embodiments are within the scope of the following claims.

While certain features of the disclosed subject matter have been illustrated and described herein, many modifications, substitutions, changes, and equivalents will now occur to those skilled in the art. It is, therefore, to be understood that the appended claims are intended to cover all such modifications and changes that fall within the true spirit of the disclosed subject matter.

What is claimed is:

1. A method for processing a group of instructions, the method comprising:
selecting an instruction to schedule, the instruction associated with an operand, wherein the operand comprises a live range representing the operational duration of the operand relative to the group of instructions being processed;
attempting to allocate a preserved register to the operand for its live range when its live range spans a function call;
attempting to allocate a scratch register to the operand for its live range when its live range does not span the function call; and
scheduling the instruction when the allocation of the preserved register or the scratch register is successful.

2. The method of claim 1, further comprising:
terminating the attempt to allocate the preserved register or the scratch register to the operand for its live range when the operand's use by the selected instruction falls at the end of the live range; and
marking the preserved register or the scratch register allocated to the operand as available for reallocation.

3. The method of claim 1, wherein attempting to allocate the preserved register comprises:
allocating the preserved register to the operand for its live range when the preserved register is in a list of previously used preserved registers marked as available for allocation.

4. The method of claim 3, further comprising:
attempting to find a second preserved register in the list of previously used preserved registers and currently allocated to a tentative live range of a second operand; and
reallocating the second preserved register to the operand for its live range and reserving a different preserved register to the second operand for its tentative live range when the attempt to find the second preserved register allocated to the second operand for its tentative live range is successful.

5. The method of claim 4, further comprising
adding a new preserved register to the list of previously used preserved registers; and
allocating the new preserved register to the operand for its live range when the attempt to find the second preserved register allocated to the second operand for its tentative live range fails.

6. The method of claim 1, wherein attempting to allocate the scratch register to the operand for its live range comprises:
attempting to deallocate a second scratch register from a tentative live range of a second operand when the attempt to allocate the scratch register to the operand for its live range fails;

allocating the second scratch register to the operand for its live range when the second scratch register is successfully deallocated from the second operand for its tentative live range; and attempting to allocate the preserved register to the operand for its live range when the attempt to deallocate the second scratch register from the second operand for its tentative live range fails.

7. The method of claim 1, further comprising:

marking the live range of the operand as a tentative live range when current information about the live range is insufficient to determine whether or not the live range spans the function call;

pre-allocating both the scratch register and the preserved register to the operand for its tentative live range;

processing one or more additional instructions; and waiting for additional information about the tentative live range.

8. The method of claim 7, further comprising:

receiving the additional information about the tentative live range;

deallocating the preserved register from the operand for its tentative live range when the last use of the operand for its tentative live range has been scheduled; and deallocating the scratch register from the operand for its tentative live range when the function call is scheduled before the last use of the operand for its tentative live range or when the scratch register is reallocated by any other process.

9. The method of claim 7, further comprising:

attempting to allocate a currently unused preserved register in the list of previously used preserved registers to the operand for its tentative live range; and attempting to allocate a new unused preserved register to the operand for its tentative live range when the attempt to allocate the currently unused preserved register to the operand for its tentative live range fails.

10. The method of claim 7, further comprising:

attempting to allocate the preserved register to the operand for its tentative live range when the scratch register is determined to be unavailable.

11. The method of claim 1, further comprising:

inserting a register spill when the attempt to allocate the preserved register and the attempt to allocate the scratch register to the operand for its live range both fail; and either re-attempting to allocate the preserved register and the scratch register to the operand for its live range, or selecting a second instruction to schedule.

12. An article of manufacture comprising a machine readable medium having logic thereon that, when executed, the logic provides for processing a group of instructions, the logic further providing for:

selecting an instruction to schedule, the instruction associated with an operand, wherein the operand comprises a live range representing the operational duration of the operand relative to the group of instructions being processed;

attempting to allocate a preserved register to the operand for its live range when its live range spans a function call;

attempting to allocate a scratch register to the operand for its live range when its live range does not span the function call; and scheduling the instruction when the allocation of the preserved register or the scratch register is successful.

13. The article of manufacture of claim 12, the logic further providing for:

terminating the attempt to allocate the preserved register or the scratch register to the operand for its live range when the operand's use by the selected instruction falls at the end of the live range; and marking the preserved register or the scratch register allocated to the operand as available for reallocation.

14. The article of manufacture of claim 12, wherein the logic providing for attempting to allocate the preserved register comprises:

allocating the preserved register to the operand for its live range when the preserved register is in a list of previously used preserved registers marked as available for allocation.

15. The article of manufacture of claim 14, the logic further providing for:

attempting to find a second preserved register in the list of previously used preserved registers and currently allocated to a tentative live range of a second operand; and reallocating the second preserved register to the operand for its live range and reserving a different preserved register to the second operand for its tentative live range when the attempt to find the second preserved register allocated to the second operand for its tentative live range is successful.

16. The article of manufacture of claim 15, the logic further providing for:

adding a new preserved register to the list of previously used preserved registers; and allocating the new preserved register to the operand for its live range when the attempt to find the second preserved register allocated to the second operand for its tentative live range fails.

17. The article of manufacture of claim 12, wherein the logic providing for attempting to allocate the scratch register to the operand for its live range comprises:

attempting to deallocate a second scratch register from a tentative live range of a second operand when the attempt to allocate the scratch register to the operand for its live range fails;

allocating the second scratch register to the operand for its live range when the second scratch register is successfully deallocated from the second operand for its tentative live range; and attempting to allocate the preserved register to the operand for its live range when the attempt to deallocate the second scratch register from the second operand for its tentative live range fails.

18. The article of claim 12, the logic further providing for:

marking the live range of the operand as a tentative live range when current information about the live range is insufficient to determine whether or not the live range spans the function call;

pre-allocating both the scratch register and the preserved register to the operand for its tentative live range;

processing one or more additional instructions; and waiting for additional information about the tentative live range.

19. The article of manufacture of claim 18, the logic further providing for:

receiving the additional information about the tentative live range;

deallocating the preserved register from the operand for its tentative live range when the last use of the operand for its tentative live range has been scheduled; and deallocating the scratch register from the operand for its tentative live range when the function call is scheduled before the last use of the operand for its tentative live range or when the scratch register is reallocated by any other process.

20. The article of manufacture of claim 18, the logic further providing for:
attempting to allocate a currently unused preserved register in the list of previously used preserved registers to the operand for its tentative live range; and
attempting to allocate a new unused preserved register to the operand for its tentative live range when the attempt to allocate the currently unused preserved register to the operand for its tentative live range fails.

21. The article of manufacture of claim 18, the logic further providing for:
attempting to allocate the preserved register to the operand for its tentative live range when the scratch register is determined to be unavailable.

22. The article of manufacture of claim 12, the logic further providing for:
inserting a register spill when the attempt to allocate the preserved register and the attempt to allocate the scratch register to the operand for its live range both fail; and
either re-attempting to allocate the preserved register and the scratch register to the operand for its live range, or selecting a second instruction to schedule.

23. An apparatus comprising:
an instruction scheduler to process a group of instructions, the instruction scheduler to further select an instruction to schedule, the instruction associated with an operand, the operand comprising a live range to represent the operational duration of the operand relative to the group of instructions to be processed; and
a register allocator to attempt to allocate a preserved register to the operand for its live range when its live range spans a function call and attempt to allocate a scratch register to the operand for its live range when its live range does not span the function call.

24. The apparatus of claim 23, wherein the register allocator to further
terminate the attempt to allocate the preserved register or the scratch register to the operand for its live range when the operand's use by the selected instruction is to fall at the end of the live range, and
mark the preserved register or the scratch register to be allocated to the operand as available for reallocation.

25. The apparatus of claim 23, wherein the register allocator to further
allocate the preserved register to the operand for its live range when the preserved register is in a list of previously used preserved registers to be marked as available for allocation.

26. The apparatus of claim 25, wherein the register allocator to further
attempt to find a second preserved register in the list of previously used preserved registers to be allocated to a tentative live range of a second operand,
reallocate the second preserved register to the operand for its live range, and
reserve a different preserved register to the second operand for its tentative live range when the attempt to find the second preserved register allocated to the second operand for its tentative live range is successful.

27. The apparatus of claim 26, wherein the register allocator to further
add a new preserved register to the list of previously used preserved registers and allocate the new preserved register to the operand for its live range when the attempt to find the second preserved register allocated to the second operand for its tentative live range fails.

28. The apparatus of claim 23, wherein the attempt to allocate the scratch register to the operand for its live range comprises the register allocator to further:
attempt to deallocate a second scratch register from a tentative live range of a second operand when the attempt to allocate the scratch register to the operand for its live range fails,
allocate the second scratch register to the operand for its live range when the second scratch register is successfully deallocated from the second operand for its tentative live range, and
attempt to allocate the preserved register to the operand for its live range when the attempt to deallocate the second scratch register from the second operand for its tentative live range fails.

29. The apparatus of claim 23, wherein the register allocator to further
pre-allocate both the scratch register and the preserved register to the operand for its tentative live range,
process one or more additional instructions, and
wait for additional information about the tentative live range.

30. The apparatus of claim 29, wherein the register allocator to further
receive the additional information about the tentative live range,
deallocate the preserved register from the operand for its tentative live range when the last use of the operand for its tentative live range has been scheduled, and
deallocate the scratch register from the operand for its tentative live range when the function call is scheduled before the last use of the operand for its tentative live range or when the scratch register is reallocated by any other process.

31. The apparatus of claim 30, wherein the register allocator to further
attempt to allocate an unused preserved register in the list of previously used preserved registers to the operand for its tentative live range, and
attempt to allocate a new unused preserved register to the operand for its tentative live range when the attempt to allocate the unused preserved register to the operand for its tentative live range fails.

32. The apparatus of claim 29, wherein the register allocator to further
attempt to allocate the preserved register to the operand for its tentative live range when the scratch register is determined to be unavailable.

33. The apparatus of claim 23, the register allocator to further
insert a register spill when the attempt to allocate the preserved register and the attempt to allocate the scratch register to the operand for its live range both fail, and
either re-attempt to allocate the preserved register and the scratch register to the operand for its live range, or select a second instruction to schedule.

34. The apparatus of claim 23, wherein the register allocator further comprises:
a scratch register allocator to allocate scratch registers to operands for their live ranges when the live ranges do not span a function call;

a preserved register allocator to allocate preserved registers to operands for their live ranges when the live ranges span the function call; and a tentative register allocator to allocate either the scratch register or the preserved register to their respective live ranges when it is unknown whether or not the live ranges span the function call.

35. A system comprising a processor to execute a compiler integrated with the system and a computer-readable storage medium having a group of instructions stored thereon, wherein the compiler integrated with the system comprises:

an instruction scheduler to process the group of instructions, the instruction scheduler to further select an instruction to schedule, the instruction associated with an operand, the operand comprising a live range to represent the operational duration of the operand relative to the group of instructions to be processed; and a register allocator to attempt to allocate a preserved register to the operand for its live range when its live range spans a function call and attempt to allocate a scratch register to the operand for its live range when its live range does not span the function call.

36. The system of claim 35, wherein the register allocator to further terminate the attempt to allocate the preserved register or the scratch register to the operand for its live range when the operand's use by the selected instruction is to fall at the end of the live range, and mark the preserved register or the scratch register to be allocated to the operand as available for reallocation.

37. The system of claim 35, wherein the register allocator to further allocate the preserved register to the operand for its live range when the preserved register is in a list of previously used preserved registers to be marked as available for allocation.

38. The system of claim 37, wherein the register allocator to further attempt to find a second preserved register in the list of previously used preserved registers to be allocated to a tentative live range of a second operand, reallocate the second preserved register to the operand for its live range, and reserve a different preserved register to the second operand for its tentative live range when the attempt to find the second preserved register allocated to the second operand for its tentative live range is successful.

39. The system of claim 38, wherein the register allocator to further add a new preserved register to the list of previously used preserved registers and allocate the new preserved register to the operand for its live range when the attempt to find the second preserved register allocated to the second operand for its tentative live range fails.

40. The system of claim 35, wherein the attempt to allocate the scratch register to the operand for its live range comprises the register allocator to further:

attempt to deallocate a second scratch register from a tentative live range of a second operand when the attempt to allocate the scratch register to the operand for its live range fails, allocate the second scratch register to the operand for its live range when the second scratch register is successfully deallocated from the second operand for its tentative live range, and attempt to allocate the preserved register to the operand for its live range when the attempt to deallocate the second scratch register from the second operand for its tentative live range fails.

41. The system of claim 35, wherein the register allocator to further pre-allocate both the scratch register and the preserved register to the operand for its tentative live range, process one or more additional instructions, and wait for additional information about the tentative live range.

42. The system of claim 41, wherein the register allocator to further receive the additional information about the tentative live range, deallocate the preserved register from the operand for its tentative live range when the last use of the operand for its tentative live range has been scheduled, and deallocate the scratch register from the operand for its tentative live range when the function call is scheduled before the last use of the operand for its tentative live range or when the scratch register is reallocated by any other process.

43. The system of claim 42, wherein the register allocator to further attempt to allocate an unused preserved register in the list of previously used preserved registers to the operand for its tentative live range, and attempt to allocate a new unused preserved register to the operand for its tentative live range when the attempt to allocate the unused preserved register to the operand for its tentative live range fails.

44. The system of claim 41, wherein the register allocator to further attempt to allocate the preserved register to the operand for its tentative live range when the scratch register is determined to be unavailable.

45. The system of claim 35, the register allocator to further insert a register spill when the attempt to allocate the preserved register and the attempt to allocate the scratch register to the operand for its live range both fail, and either re-attempt to allocate the preserved register and the scratch register to the operand for its live range, or select a second instruction to schedule.

46. The system of claim 35, wherein the register allocator further comprises:

a scratch register allocator to allocate scratch registers to operands for their live ranges when the live ranges do not span a function call;

a preserved register allocator to allocate preserved registers to operands for their live ranges when the live ranges span the function call; and a tentative register allocator to allocate either the scratch register or the preserved register to their respective live ranges when it is unknown whether or not the live ranges span the function call.

* * * * *